United States Patent [19]

Wündsch

[11] 4,139,176

[45] Feb. 13, 1979

[54] MOLD, FOR SCREW-THREADED ARTICLES

[76] Inventor: Johannes G. Wündsch, Kronacher Str. 32, 8641 Neuses bei Kronach (BRD), Fed. Rep. of Germany

[21] Appl. No.: 819,681

[22] Filed: Jul. 27, 1977

[30] Foreign Application Priority Data

Jul. 29, 1976 [DE] Fed. Rep. of Germany ....... 2634152

[51] Int. Cl.² .............................................. B29F 1/14
[52] U.S. Cl. .................................... 249/59; 425/438; 164/345
[58] Field of Search .......................... 425/438; 249/59

[56] References Cited

U.S. PATENT DOCUMENTS

| 2,306,205 | 12/1942 | Crosman | 249/59 X |
| 2,363,808 | 11/1944 | Sayre | 249/59 X |
| 2,984,862 | 5/1961 | Chabotte | 425/438 X |
| 3,388,431 | 6/1968 | Aoki | 249/59 X |
| 3,719,446 | 3/1973 | Cleevely | 249/59 X |

Primary Examiner—J. Howard Flint, Jr.
Attorney, Agent, or Firm—Schuyler, Birch, Swindler, McKie & Beckett

[57] ABSTRACT

A mold, for screw-threaded articles, has screw-thread forming spindles rotatable by obliquely toothed gearing so as to apply axial thrust to the spindles and thus compensate for friction and adhesion in unloading of the mold.

3 Claims, 2 Drawing Figures

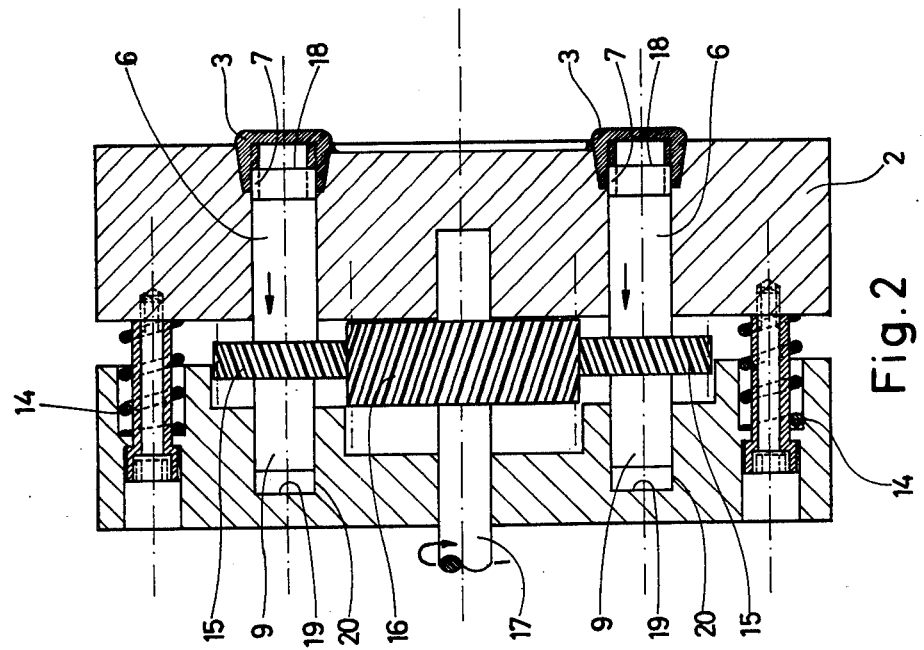
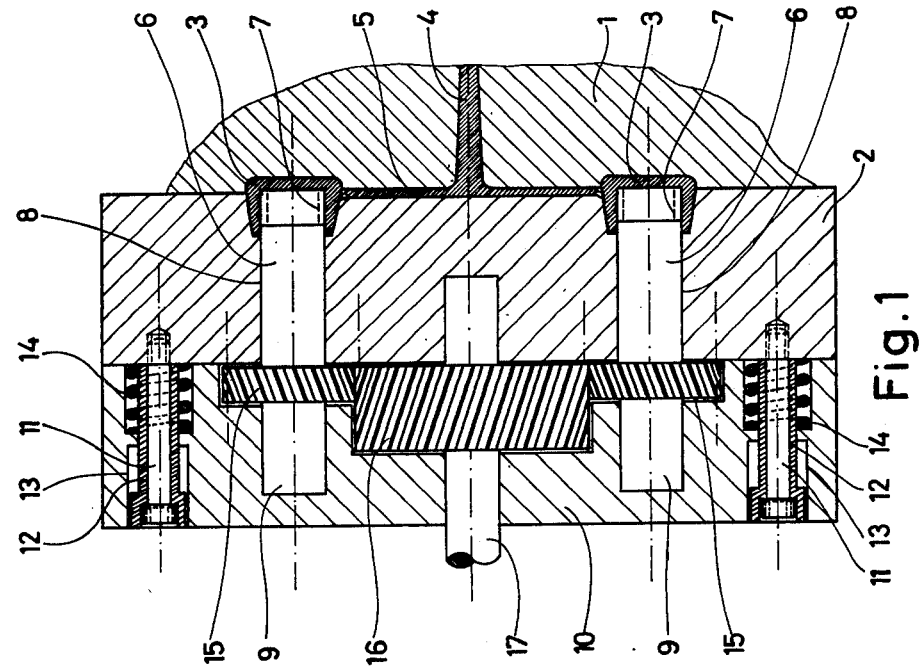

MOLD, FOR SCREW-THREADED ARTICLES

This invention relates to molds for screw-threaded articles, made by casting metal or plastics material, the term "casting" being used to include equivalent forming methods such as die-casting, injection molding and other molding operations, in which the material flows in the mold, with or without pressure.

It is known to provide a mold comprising at least one rotatable and axially displaceable spindle with a screw-thread for shaping the screw-thread of a respective molded article, the spindle having a gear wheel through which the spindle is rotated by a driving gear wheel in unloading operation of the mold. Such a mold is referred to hereinafter as "a mold of the kind defined".

In such known molds, the spindle has an additional screw-thread which screws into a counter-thread, in unloading of the mold, so as to withdraw the forming thread from the molded article, the additional screw-thread having the same pitch as the molded thread so that the latter is not required to transmit any axial force. Such an arrangement is known by the term "threading cartridge".

If such a mold is to be converted to produce articles with different threading, the spindle and its associated counter-thread must be replaced. This necessitates considerable expense for individual parts to be kept in stock and also makes the conversion operation more difficult. The so-called threading cartridge is also subject, in the case of mass-production effected for example with die-casting molds, to considerable wear which after a short time leads to axial play of the thread on the spindle in relation to the counter-thread and to a corresponding shifting of the spindle in relation to the molded thread in the mold unloading operation. With increasing wear of the threading cartridge, articles to be removed from the mold are correspondingly axially stressed during removal and damage frequently occurs in the molded thread which is still delicate.

The invention is based upon the problem of avoiding on the one hand damage to the molded thread by reason of wear of the threading cartridge and on the other hand rendering the replacement of parts pertaining to a threading cartridge unnecessary.

According to the invention, in a mold of the kind defined, the gear wheels are obliquely toothed so that rotation of the driving gear wheel imparts to the spindle an axial thrust which substantially compensates for opposing frictional and adhesion forces acting upon the spindle in unloading of the mold.

In a preferred construction, the spindle is journalled in coaxially opposed bores in relatively axially displaceable members of the mold which move apart in unloading of the mold so that the spindle can move axially in the bores.

By reason of the oblique teeth, on rotation of the driving gear wheel the spindle automatically receives an axial thrust, which can be controlled by suitable selection of the angle of the oblique teeth, so that the axial friction and adhesion forces acting upon the spindle are substantially compensated. In screwing of the spindle out of the molded thread, the latter therefore does not have to overcome friction and adhesion forces so that it is not axially stressed. The friction forces which arise are those due to the necessary axial displacement of the spindle and the adhesion forces are those due to possible adhesion of the spindle to an end face of the article molded. Axial adhesion forces are more likely to occur with steep pitch threads. Any tooth flank play between the driving gear wheel and the spindle gear wheel does not affect the mold-unloading operation because the driving gear wheel runs up on to the teeth of the spindle gear wheel so that the torque acting upon the spindle for screwing out of the molded thread and the desired axial thrust force always occur simultaneously. In the known threading cartridge on the other hand play delays axial thrust until the spindle has been rotated through a certain angle.

Since axial friction forces incidentally also occur between the two gear wheels in their rotation, the oblique toothing additionally produces the advantageous effect that at the beginning of the screwing out of the spindle thread a relatively high torque has to be applied which causes correspondingly high axial friction forces between the gear wheels. On application of such a high torque however a correspondingly high axial thrust force also occurs. If friction reduces as the spindle screws out of the molded thread, the axial friction forces between the gear wheels also decrease but on account of the reduction of the torque involved therewith the axial thrust force is correspondingly reduced. The result of this is that the axial thrust force to be applied is automatically adapted to the changing friction forces.

The simple measure of using gear wheels with oblique teeth achieves the object that the requisite thrust force is generated without requiring other components. Thus, the use of relatively expensive threading cartridges subject to rapid wear is avoided. Furthermore the advantage is obtained that, in closing the mold for each molding operation, the spindle can remain stationary in the position reached in each case, whereas in the case of the use of a threading cartridge the spindle must be brought back again into its initial position for each operation.

An example of a preferred embodiment of the invention is illustrated on the accompanying drawing, in which:

FIG. 1 shows in axial section a die-casting mold in the closed position, and

FIG. 2 shows the same mold during the mold-unloading operation with the thread-forming spindles partially screwed out.

The die-casting mold as illustrated in FIG. 1 consists of an upper part 1, only partly shown, and a lower part 2 represented in the closed position in which the die-cast articles 3 are enclosed in their cavities. Two articles 3 are shown but it is of course possible to cast a larger number of articles at the same time. The upper part 1 has a central sprue 4 which continues by way of the runners 5 to the cavities in which the articles 3 are cast. On opening of the mold, by lifting of the upper part 1 away from the lower part 2, metal left in the runners 5 breaks away from the articles 3 in known manner.

Into the cast articles 3, in this case screw caps, there extend spindles 6 which each have an external thread 7 at the ends within the articles 3 which thus have a complementary internal thread.

The spindles 6 are journalled in plain bores 8 in the lower part 2 and, by their tail ends 9, in a back plate 10. The back plate 10 is secured to the lower part 2 by means of bolts 11 housed in sleeves 12 clamped by the bolts 11 against the lower part 2. The sleeves 12 each extend through a bore 13 in the back plate 10 which permits the back plate 10 to be withdrawn from the lower part 2 to the left (see FIG. 2) under the thrust of a spring 14. When the die-casting mold is in the closed condition as represented in FIG. 1 however the entire mold, including the back plate 10, is held in the position as illustrated by external clamps (not shown).

The spindles 6 are each provided with an obliquely toothed gear wheel 15 engaged with a centrally arranged driving gear wheel 16 which has corresponding oblique teeth and is mounted on a shaft 17 of a drive system (not shown). The shaft 17 extends into the lower part 2 and is secured against axial displacement by known means (not shown). The driving gear wheel 16 thus constantly retains its axial position in relation to the lower part 2, even when the back plate 10 is withdrawn from the lower part 2 (see FIG. 2).

The mold-unloading operation will now be explained with reference to FIG. 2. For this purpose the shaft 17 is set in rotation in the direction of the arrow and drives the gear wheels 15 through the gear wheel 16. Consequent rotation of the spindles 6 withdraws their threads 7 from the internal threads of the cast articles 3. In FIG. 2 this unscrewing operation is shown as approximately half completed. Under the action of the oblique teeth of the drive gear wheel 6 and spindle gear wheels 15, an axial thrust acts upon the spindles 6, as indicated by the arrows, by which the spindles are withdrawn from the lower part 2. This axial thrust is just large enough substantially to compensate the opposing axial friction forces and adhesion forces. The axial friction forces are essentially due to friction of the spindles 6 in the bores 8 and to the tooth flank friction between the gear wheels 15 and 16. The axial adhesion forces occur between the end faces 18 of the spindles and the opposed inner walls of the articles 3 and also, especially in the case of steep pitches, at the cast thread flanks. In the screwing out of the spindles 6 the cast threads in the articles 3 do not need to supply any axial thrust and are therefore protected against damage.

Before the screwing-out operation of the spindles 6, the mold is opened so that the pressure between the back plate 10 and the lower part 2 is relieved and the back plate 10 can separate from the lower part 2 under the action of the springs 14, as illustrated in FIG. 2. The ends 9 of the spindles 6 are given axial clearance in their bores so that in the following rotation of the driving gear wheel 16 they are able to move axially away from the lower part 2.

The operation of screwing-out the spindles 6 is continued by rotation of the driving gear wheel 16 until the threads 7 are screwed completely out of the articles 3, the axial thrust acting upon the spindles 6 ensuring complete withdrawal of the spindles 6 from the articles 3. It is not necessary to ensure stopping of the driving gear wheel 16 in a specific position of the spindles 6, since even on continued drive of the gear wheel 16 the ends 9 of the threaded spindles 6 only encounter the ends of the respective bores in the back plate 10 without any damage occurring. In the case of the previous use of threading cartridges on the other hand, careful attention must be given to termination of the unscrewing operation so that the corresponding counter-threads are not destroyed by excessive drive of the spindles.

For closing the mold and bringing the back plate 10 up to the lower part 2, no special drive of the spindles 6 is necessary, the ends 9 of the spindles being pushed by the bases 19 of the respective bores 20 in the back plate 10 into the closed position illustrated in FIG. 1. A fresh casting operation can thereupon be carried out.

It should also be pointed out that with the arrangement as described it is possible to produce both internal threads and external threads in the cast articles, the spindles 6 being provided accordingly either with an external thread as illustrated or with a threaded sleeve or socket.

The term mold includes every kind of molding cavity into which material is introduced to flow with or without pressure. The molding material may be metal, synthetic plastics materials or other suitable material.

For the casting of metals and the casting or injection-molding of synthetic plastics material a helix angle of the oblique teeth of the gear wheels of about 20° has proved suitable. For softer materials a somewhat smaller angle, for example 15°, may be selected.

What is claimed is:

1. A mold for producing screw-threaded molded articles, comprising:
    a mold part having at least one spindle carrying a screw-thread for shaping the screw-thread of an article incident its being molded, said spindle being mounted on said mold part to be rotatable and axially displaceable relative to said mold part,
    a driven gear wheel secured to said spindle to be rotatably driven and axially displaced in unloading a molded article from the mold,
    a driving gear wheel mounted to be rotatable about an axis parallel to the rotation axis of said driven gear wheel,
    each of said gear wheels having radially projecting teeth on the periphery thereof with the teeth of said driving gear wheel drivingly interengaged with the teeth of said driven gear wheel, said radially projecting teeth of each of said gear wheels being obliquely disposed relative the rotation axis of the particular gear wheel, said driving gear wheel imparting during its rotation an axial thrust to said spindle through the drivingly interengaged obliquely disposed teeth on said gear wheels to substantially compensate for opposing frictional and adhesion forces acting upon said spindle during unloading of a molded article from the mold.

2. A mold according to claim 1 in which said spindle is journalled in coaxially opposed plain bores, said bores being disposed respectively in relatively axially displaceable members of the mold, said members being mounted to move apart in unloading of the mold, said spindle being axially moveable in said bores.

3. A mold according to claim 1 in which the drivingly interengaged oblique teeth on said gear wheels are disposed at a helix angle of about 20°.

* * * * *